United States Patent [19]
Mitschelen et al.

[11] Patent Number: 5,593,208
[45] Date of Patent: Jan. 14, 1997

[54] VEHICLE SEAT

[75] Inventors: Rolf Mitschelen, Kircheim; Werner Hauser, Calw; Thomas Geisel, Böblingen, all of Germany

[73] Assignee: Mercedes-Benz AG, Stuttgart, Germany

[21] Appl. No.: 357,206

[22] Filed: Dec. 13, 1994

[30] Foreign Application Priority Data

Dec. 13, 1993 [DE] Germany .............. 43 42 438.4

[51] Int. Cl.$^6$ ........................................ B62N 2/30
[52] U.S. Cl. ...................... 297/336; 297/335; 296/65.1
[58] Field of Search ........................... 297/74, 331, 334, 297/335, 336, 411.39; 296/65.1

[56] References Cited

U.S. PATENT DOCUMENTS

| | | | |
|---|---|---|---|
| 4,351,562 | 9/1982 | Twitchell et al. | 297/411.39 X |
| 4,408,798 | 10/1983 | Mizushima et al. | 296/65.1 |
| 4,881,778 | 11/1989 | Stephenson et al. | 297/411.39 |
| 5,372,398 | 12/1994 | Aneiros et al. | 296/65.1 |

FOREIGN PATENT DOCUMENTS

| | | |
|---|---|---|
| 3507894 | 10/1985 | Germany . |
| 2155780 | 10/1985 | United Kingdom . |
| 924106 | 3/1995 | United Kingdom . |

*Primary Examiner*—Peter R. Brown
*Attorney, Agent, or Firm*—Evenson, McKeown, Edwards & Lenahan, P.L.L.C.

[57] ABSTRACT

A vehicle seat has a seat frame and a backrest retained pivotally thereon. Pairs of front and rear legs are articulated on the seat frame and are intended for fastening the seat frame on the vehicle floor. The rear legs are locked releasably on the vehicle floor for the purpose of pivoting the seat cushion upwards and are coupled so as to be forced to move with the pivoting movement of the seat cushion, such that they fold onto the seat frame during the pivoting operation. For the purpose of achieving a cost-effective, rattle-free pivoting mechanism for the rear legs, the front legs are assigned a first belt pulley and the rear legs are assigned a second belt pulley, and the two belt pulleys are connected to one another via a drive belt. Each belt pulley is arranged, on the associated legs, coaxially with respect to the articulation point of the legs on the seat frame and is connected in a rotationally mixed manner to at least one leg.

18 Claims, 3 Drawing Sheets

Fig. 3
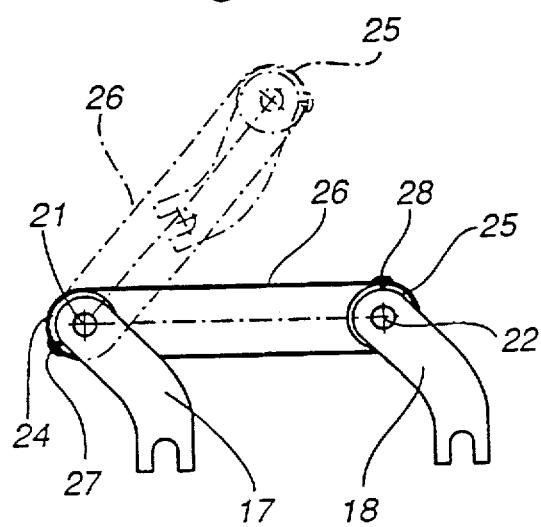
Fig. 4
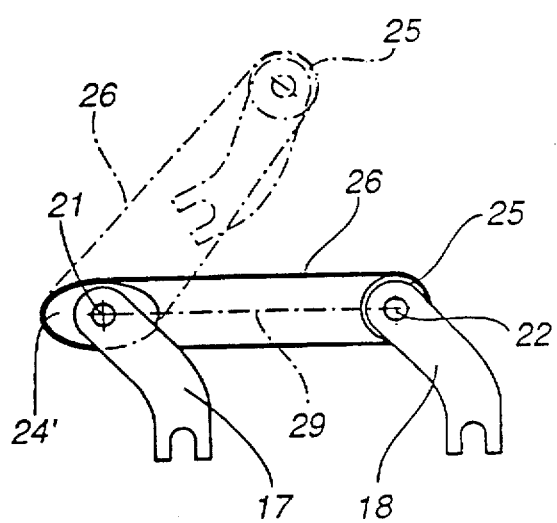
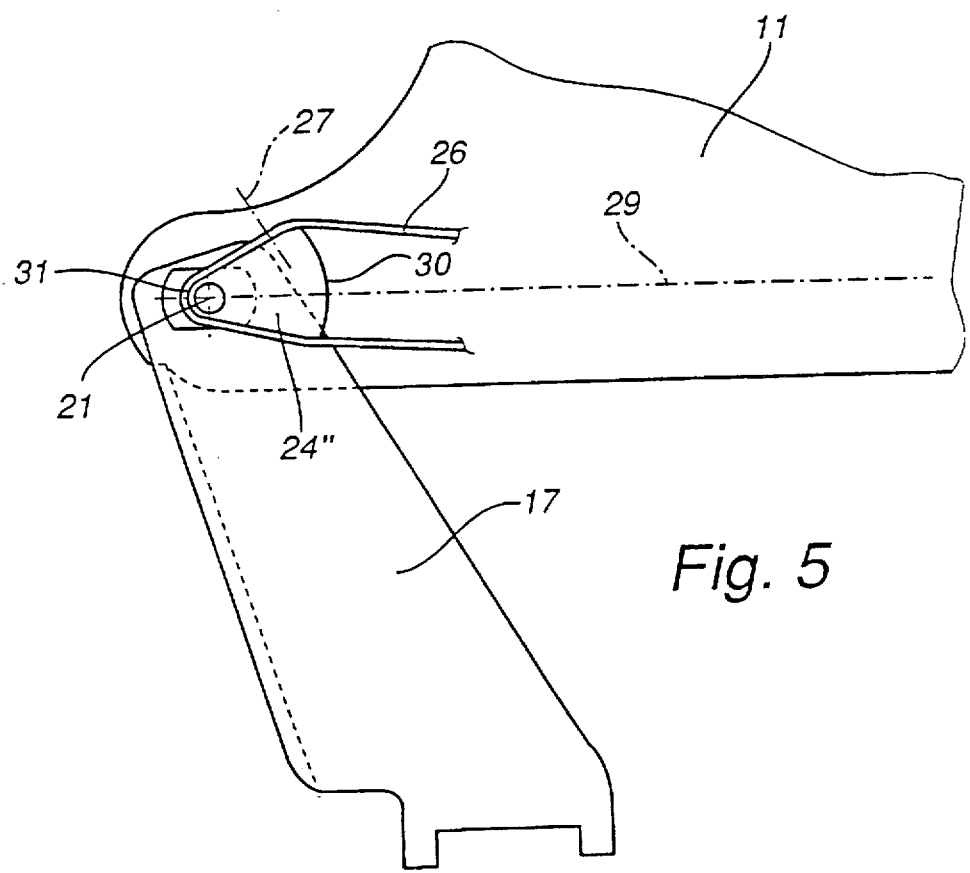
Fig. 5

VEHICLE SEAT

BACKGROUND AND SUMMARY OF THE INVENTION

The invention relates to a vehicle seat which is pivotally movable between a use position and a stowed position.

In the case of a known vehicle seat of this type (DE 35 07 894 C2), rear legs of the vehicle seat are coupled by connecting rods so as to be forced to move with the pivoting movement of the seat cushion, a connecting rod being articulated on the front and rear leg on each side of the vehicle seat. In order that they can run smoothly during pivoting, articulations or pivot connections require a certain amount of play, this, of course, resulting in rattling noises which become more prominent as the service life increases and are extremely troublesome for the vehicle occupants. Such rattling noises can be avoided only by high-outlay structural damping measures. Moreover, such a connecting-rod system may take up positions in the vicinity of the dead center, this resulting in sluggishness and jamming and being avoidable only with additional outlay in terms of design.

An object of the invention is, in the case of the vehicle seat of the type mentioned in the introduction, to specify a cost-effective design solution for automatically folding the rear legs onto the seat frame when the seat cushion is pivoted upwards, said solution being free of jamming and also still being absolutely free of rattling even after a relatively long operating period of the motor vehicle.

This object is achieved according to the invention, by providing a vehicle seat comprising a seat cushion including a seat frame and seat upholstery, a backrest pivotally supported on the seat frame to be foldable over onto the seat upholstery when the seat is in a stowed position, pairs of downwardly projecting front and rear legs pivotally connected to the seat frame and serving to fasten the seat frame on a vehicle floor, said rear legs being releasably lockable on the floor to accommodate upward pivoting movement of the seat cushion, a first belt pulley arranged coaxially with respect to a pivot connection of the front legs on the seat frame and connected in a rotationally fixed manner to at lest one front leg, a second belt pulley arranged coaxially with respect to a pivot connection of the rear legs on the seat frame and connected in a rotationally fixed manner to at least one rear leg, and a drive belt connecting the first and second belt pulleys such that the rear legs are forced to move to a stowed position when the seat cushion is pivoted upwardly to a seat stowed position.

In the case of the vehicle seat according to the invention, the rear legs are forced to fold onto the seat frame when the seat cushion is pivoted upwards in order to provide free space by means of belt pulleys. The belt pulleys are connected in a rotationally fixed and thus rattle-free manner to the front and rear legs. At least one drive belt connects the belt pulleys to one another and consists of a flexurally soft material and likewise does not cause any rattling noises even in the event of decreasing tensioning in the belt. The belt pulleys and drive belts are manufactured from plastic, preferably as injection-molded parts, and can thus be produced inexpensively, with the result that the design solution according to the invention is also appropriately priced for small, inexpensive motor vehicles.

The pivoting structure according to the invention can be just as advantageously used in the case of lower seats with a small spacing of the seat cushion from the vehicle floor as with high seats with a considerable amount of clearance beneath the seat cushion.

According to an advantageous embodiment of the invention, the drive belt is preferably of an endless design, e.g., designed as a toothed belt or V-belt or as a flat belt consisting of a tension-resistant, flexurally soft material.

Since the pivoting angle of the belt pulleys is smaller than the loop-around angle of the drive belt, the drive belt can be fixed on the belt pulleys, provision being made for this in a preferred embodiment of the invention. Consequently, slippage between the drive belt and the belt pulleys is avoided, even in the event of material fatigue of the drive belt, and precise, play-free pivoting of the rear legs into their position in which they are folded on the seat frame, and vice versa, is always achieved.

Due to the small pivoting angle of the belt pulleys, the drive belt may also, according to an alternative embodiment of the invention, be of an open-ended design and be fastened, by in each case one end, on the circumference of the belt pulleys by fastening means. Instead of the drive belt, use may also be made of a cable pull or of another non-rigid connection means which transmits a tensile force.

In a preferred embodiment of the invention, at least one of the two belt pulleys has a contour in the case of which the spacing of the circumference line from the center point which is coaxial with the pivot pin of the legs changes constantly at least over a range of angles at the circumference. In this arrangement, the belt pulley is aligned such that the maximum spacing of the circumference line from the center point coincides with the line of connection which passes through the pivot pins of the rear and front legs, locked on the vehicle floor, on the seat frame. This type of design makes it possible to achieve a rear-leg movement sequence in which, at the beginning of the pivoting operation, the rear legs first of all remain unaffected, and can thus be lifted out of the anchor region of the vehicle floor in a virtually rectilinear manner, and start to fold onto the seat frame only after a considerable pivoting movement of the seat cushion.

Other objects, advantages and novel features of the present invention will become apparent from the following detailed description of the invention when considered in conjunction with the accompanying drawings.

BRIEF DESCRIPTION OF THE DRAWINGS

FIG. 3 shows a schematic side view of the pivot mechanism for folding the rear legs when the seat cushion of the vehicle seat in FIGS. 1 and 2 is pivoted upwards;

FIG. 4 shows a similar representation to that in FIG. 3, according to a further exemplary embodiment;

FIG. 5 shows a detail of a side view of a design of the vehicle seat according to a further exemplary embodiment;

DETAILED DESCRIPTION OF THE DRAWINGS

Figure 1:
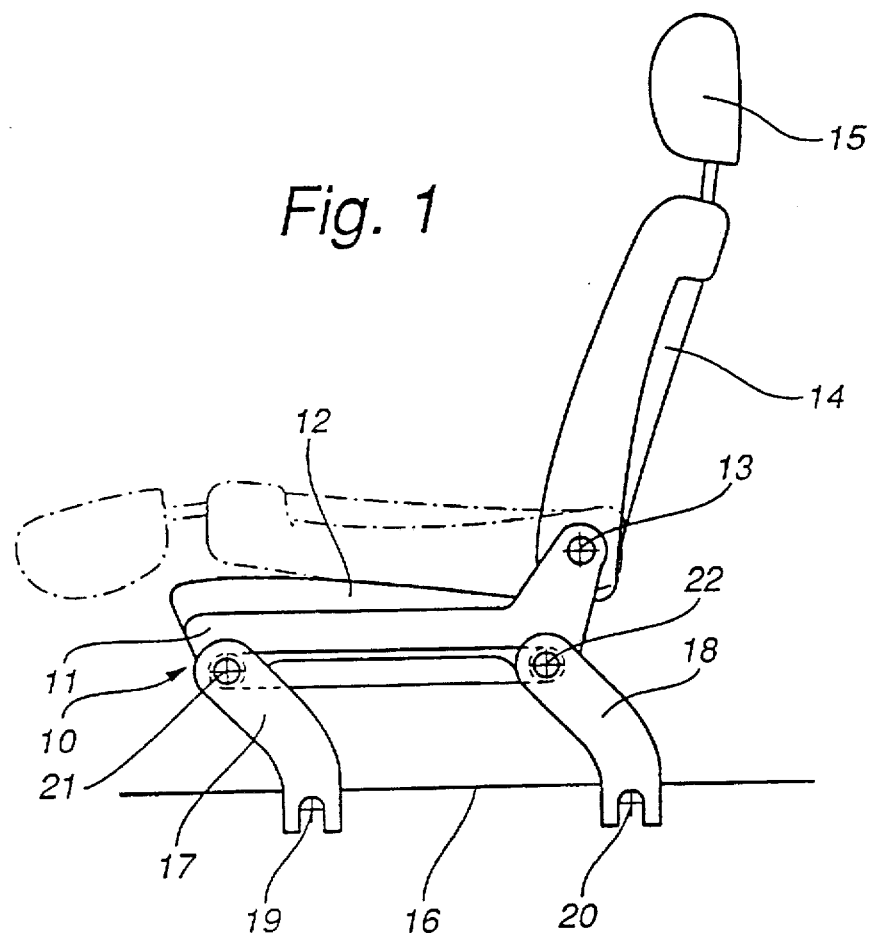
FIG. 1 schematically depicts a side view of a vehicle seat constructed according to a preferred embodiment of the invention in the use position.
Figure 2:
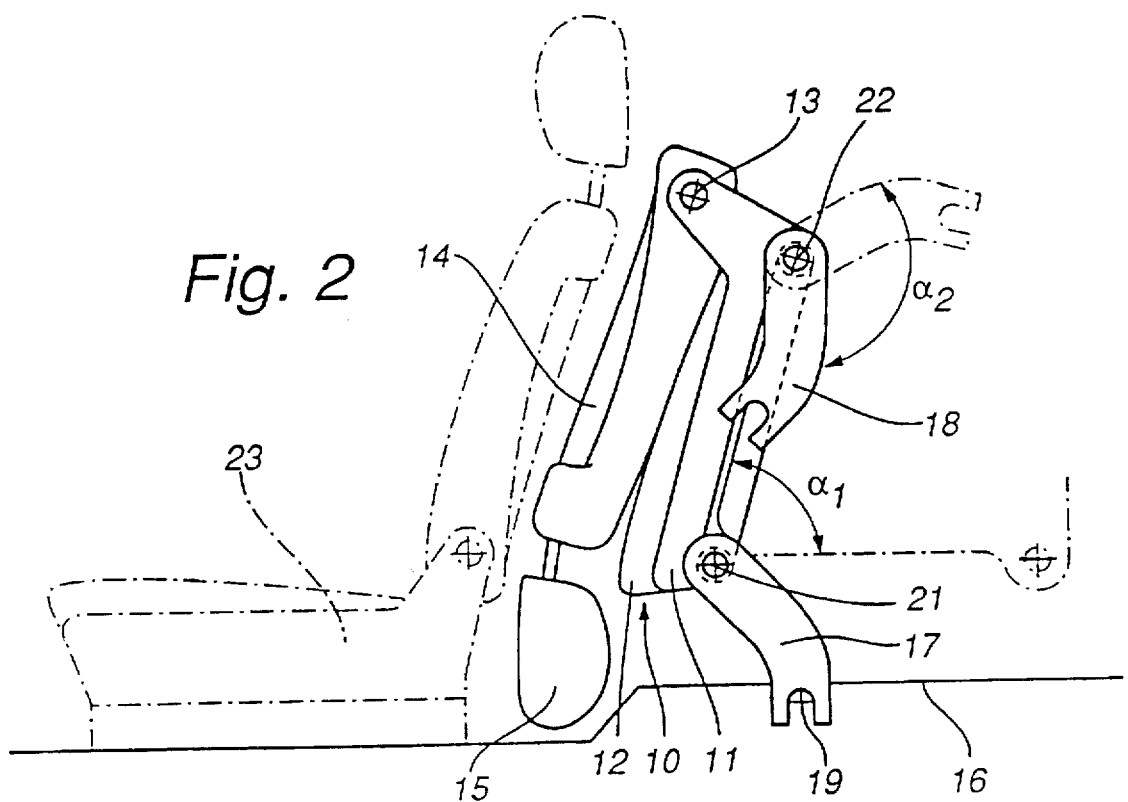
FIG. 2 schematically depicts a side view of the seat of FIG. 1 in the folded upwards position for providing loading space.
Figure 6:
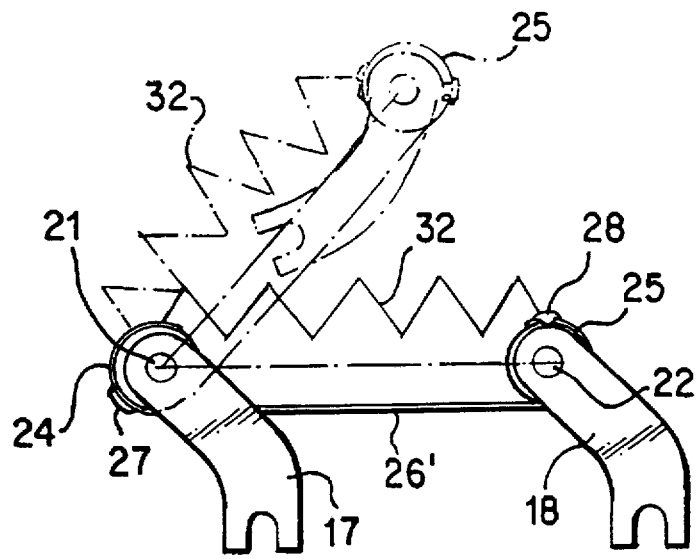
FIG. 6 shows a similar representation to that in FIG. 3, according to a further exemplary embodiment.
Figure 7:
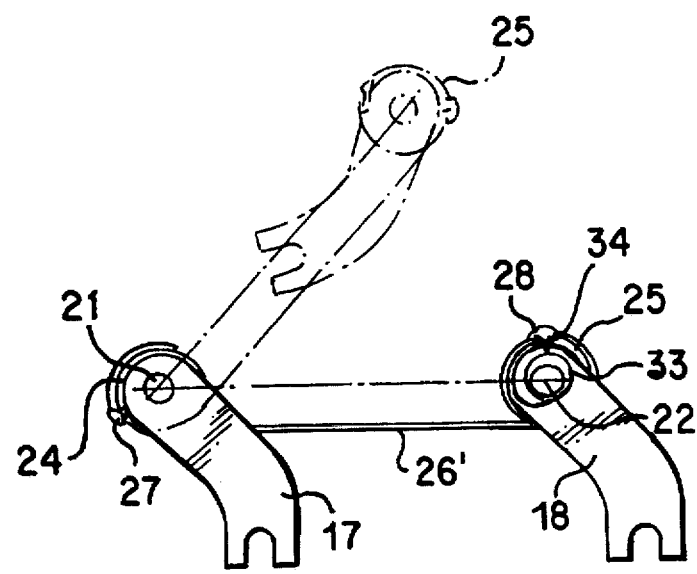
FIG. 7 shows a similar representation to that in FIG. 3, according to a further exemplary embodiment.

A rear seat is shown schematically in side view in FIGS. 1 and 2 and is intended for an estate car. The vehicle seat has a seat cushion 10, composed of a seat frame 11 and of seat upholstery 12 received therein, and a backrest 14 which can pivot on the seat frame 11 about a transversely running pivot pin 13. A headrest 15 is provided on the backrest. The backrest 14 can be folded over onto the seat upholstery 12 from a use position which is represented in solid lines in FIG. 1. This folded-over position of the backrest 14 is depicted by chain-dotted lines in FIG. 1.

The vehicle seat is fastened releasably on the vehicle floor 16 by means of front legs 17 and rear legs 18. The fastening on the rear legs 18 is designed as a quick-action locking means which is to be actuated manually and may be composed, for example, of a bolt fixed on the floor and of a locking detent which can pivot on the rear leg 18. The fastening on the front legs 17 is designed as a screw-connection or quick-action closure. The fastening locations of the front legs 17 is specified in FIG. 1 by 19 and those of the rear legs 18 is specified in FIG. 1 by 20.

The front legs 17 and the rear legs 18 are articulated on the seat frame 11 such that they project downwards, the articulation pins specified by 21 and 22 being aligned transversely with respect to the vehicle seat, that is to say parallel with respect to the pivot pin 13 of the backrest 14. The articulated connection of the front legs 17 and rear legs 18 to the seat frame 11 serves for folding away the rear seat for the purpose of increasing the loading space in the estate car. For this purpose, the quick-action locking means is released at the fastening locations 20 of the rear legs 18 on the vehicle floor 16 and, after the backrest 14 has been folded onto the seat upholstery 12, the vehicle seat is folded, through approximately 90° in the anti-clockwise direction in FIG. 1, onto the backrest of the front seat 23 which is specified by chain-dotted lines in FIG. 2, such that the rear side of the backrest 14 approximately butts against the rear side of the backrest of the front seat 23. This folded-upwards position of the rear seat is represented in FIG. 2. The pivoting angle of the seat frame 11 is characterized by $\alpha_1$.

During the pivoting operation of the seat cushion 10 with the backrest 14 about the articulation pins 21 on the front legs 17, the rear legs 18 are coupled such that, when the seat frame 11 is folded upwards, they pivot about the pivoting angle $\alpha_1$, in the clockwise direction in FIG. 2, and come to bear along the seat frame 11. In order to elucidate its structure, the pivoting mechanism provided for this purpose is represented separately in FIG. 3, i.e., without the seat cushion 10. The pivoting mechanism comprises a first belt pulley 24, which is connected in a rotationally fixed manner to the front legs 17, and a second belt pulley 25, which is connected in a rotationally fixed manner to the rear leg 18, and a drive belt 26 which connects the two belt pulleys 24, 25 to one another. The two belt pulleys 24, 25 are each arranged coaxially with respect to the articulation pins 21, 22 of the front legs 17 and of the rear leg 18. The drive belt 26 is of an endless design and loops around the two belt pulleys 24, 25 over an angle at circumference of in each case approximately 180°. The drive belt 26 is defined here as a flat belt consisting of a tension-resistant, flexurally soft material. Since the pivoting angle of the belt pulleys 24, 25 is smaller when the seat frame 11 is folded upwards than the loop-around angle of the drive belt 26, the drive belt 26 is fixed on the circumference of each belt pulley 24, 25 by fastening elements 27, 28 which are shown schematically in FIG. 3. Consequently, any slippage between the drive belt 26 and the belt pulleys 24, 25 is prevented, with the result that, when the seat frame 11 is folded upwards, the rear legs 18 pivot onto the latter to the full extent even after relatively long usage of the rear seat and decreasing tensioning in the belt. If the drive belt 26 is configured as an injection-molded plastic part of low thickness, the fastening elements 27, 28 are advantageously molded thereon. When the drive belt 26 is laid on the belt pulleys 24, 25, said molded-on fastening elements 27, 28 may either engage into cutouts provided on the circumference of the belt pulleys 24, 25 or be fixed on the circumference of the belt pulleys 24, 25 by means of screws, rivets or clips.

Upon pivoting the seat cushion 10, and the backrest 14 which has been folded onto it, into the folded-upwards position represented in FIG. 2, the seat frame 11 is pivoted about the articulation pin 21 of the fixed front legs 17 through the angle $\alpha_1$ (FIG. 2). The belt pulley 25 which is fixed on the rear leg 18 is also pivoted, through said pivoting angle $\alpha_1$, with respect to the fixed belt pulley 24. The drive belt 26 thus rotates the belt pulley 25, which is connected in a rotationally fixed manner to the rear leg 18, through the pivoting angle $\alpha_2$, whereupon the rear leg 18 which rotates with the belt pulley 25 butts against the seat frame 11.

The pivoting mechanism described may be arranged on either side of the vehicle seat, with the result that a front and rear leg 17, 18 are each connected to one another via the belt pulleys 24, 25 and the drive belt 26. It is also contemplated to design the pivot pins 21, 22 of the front legs 17 and rear legs 18 as transversely running shafts on which the front legs 17 and rear legs 18 are fastened in a rotatable manner. In this case, only one belt pulley 24, connected to a front leg 17, and one belt pulley 25, connected to a rear leg 18, are sufficient for the forced pivoting of the rear legs 18, said belt pulleys being connected to one another via the drive belt 26. The shaft is rotated by the pivoting movement of the rear leg 18 connected to the belt pulley 25, and the second rear leg 18 on the other seat side is thus also pivoted along.

In the modification, shown in FIG. 4, of the pivoting mechanism for coupling the pivoting movement of the rear legs 18 with the pivoting movement of the seat frame 11, the first belt pulley 24', which is connected in a rotationally fixed manner to the front leg 17, is designed such that it has a contour in the case of which the spacing of the circumference line from the center point which is coaxial with the articulation pin 21 of the front leg 17 changes constantly at least over a range of angles at the circumference. In the exemplary embodiment in FIG. 4, the belt pulley 24' is in the form of an ellipse. In this arrangement, the belt pulley 24' is aligned such that maximum spacing of the circumference line from the center point, in this case the largest ellipse axis, coincides with the line of connection 29 which passes through the articulation pins 21, 22 of the front and rear legs 17, 18. This design of the belt pulley 24' makes it possible for the rear leg 18, during initial pivoting of the seat frame 11, to be pivoted first of all with small step-up transmission and, in this arrangement, to be moved approximately in the manner of a parallelogram. Consequently, the rear leg 18 can move out of the fastening location 20 on the vehicle floor 16 (FIG. 1) in a relatively rectilinear manner. As the pivoting angle of the seat frame 11 increases, the rear leg 18 is then pivoted, due to the increasing step-up transmission, through an ever-increasing angle, and as described above, at the end of the pivoting operation of the seat frame 11, is folded onto the latter. Of course, it is also possible to change over the two belt pulleys 24' and 25, with the result that the ellipsoid belt pulley 24' is connected in a rotationally fixed manner to the rear leg 18 and the circular belt pulley 25 is connected in a rotationally fixed manner to the front leg 17.

FIG. 5 shows the detail of an exemplary embodiment of the pivoting mechanism which operates in accordance with the principle, illustrated in FIG. 4, of the different angular accelerations of the pivoting angles α₁ and α₂. Here, the first belt pulley 24", connected in a rotationally fixed manner to the front leg 17, is designed as a segment of a circle which has two diametrically opposite circle-arc portions 30, 31 of extremely different radii of curvature. The belt pulley 24" is aligned such that it largest dimension coincides with the line of connection 29 which passes through the articulation pin 21 of the front leg 17 and through the articulation pin 22 (not shown here) of the rear leg 18. The drive belt 26, which bears on the two legs of the segment of the circle and on the circle-arc portion 31, is fixed on the circumference of the belt pulley 24" by a fastening element which is specified by 27.

The invention is not restricted to the above-described exemplary embodiments. Consequently, the endless drive belt may be designed as a toothed belt or V-belt.

Alternatively, use may also be made of an open-ended drive belt 26' which is fastened, by means of its ends, on the circumference of each belt pulley. In this arrangement, one pulling side of the drive belt can be dispensed with if the drive-belt half on the other pulling side operates counter to a spring which may be designed either as a tension spring 32 or as a torsion spring 33 which is seated on the articulation pin 22 of the rear leg 18. In other words, one of the two drive-belt strands, which each form a pulling side of the drive belt between the two belt pulleys, is removed and a spring acting in the pulling direction is arranged in the remaining pulling side of the drive belt. In this arrangement, either the tension spring can be inserted into the remaining drive-belt strand on one pulling side or the end of the drive-belt strand can be connected to the tension spring, which, for its part, acts on the circumference of the belt pulley. In the case of the torsion spring, the torsion spring 33 is arranged coaxially with respect to the articulation pin 22 on the rear leg 18, and bears, by means of its leg 34, on the circumference of the belt pulley 25. The drive belt is connected to the spring leg likewise on the circumference of the belt pulley.

Instead of the drive belt, use may also, of course, be made of a cable or of another non-rigid connection means, with the result that, here, the term "drive belt" can be used synonymously for all possible non-rigid connection strands between the belt pulleys, which can transmit a tensile force. The belt pulleys 24 and/or 24' and/or 24" and 25, which are connected in a rotationally fixed manner to the front and rear legs 17, 18, may also be designed in one piece with the associated legs.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A vehicle seat comprising:
   a seat cushion including a seat frame and seat upholstery,
   a backrest pivotally supported on the seat frame to be foldable over onto the seat upholstery when the seat is in a stowed position,
   pairs of downwardly projecting front and rear legs pivotally connected to the seat frame and serving to fasten the seat frame on a vehicle floor, said rear legs being releasably lockable on the floor to accommodate upward pivoting movement of the seat cushion,
   a first belt pulley arranged coaxially with respect to a pivot connection of the front legs on the seat frame and connected in a rotationally fixed manner to at least one front leg,
   a second belt pulley arranged coaxially with respect to a pivot connection of the rear legs on the seat frame and connected in a rotationally fixed manner to at least one rear leg,
   and a drive belt connecting the first and second belt pulleys such that the rear legs are forced to move to a stowed position when the seat cushion is pivoted upwardly to a seat stowed position.

2. Seat according to claim 1, wherein the drive belt is of an endless design and loops around the two belt pulleys over an angle at circumference of in each case approximately 180°.

3. Seat according to claim 2, wherein the drive belt is fixed on the circumference of the two belt pulleys by fastening elements.

4. Seat according to claim 3, wherein the drive belt is produced as an injection-molded plastic part, and the fastening elements are molded on the drive belt.

5. Seat according to claim 2, wherein the drive belt is designed as a flat belt consisting of a tension-resistant, flexurally soft material.

6. Seat according to claim 2, wherein the drive belt is designed as a toothed belt or V-belt.

7. Seat according to claim 1, wherein the drive belt is of an open-ended design and is fastened by means of its ends on the circumference of respective of the belt pulleys.

8. Seat according to claim 4, wherein a first line tangential to said first and second pulleys defines a first pulling side, and wherein a second line tangential to said first and second pulleys and opposite said first tangential line defines a second pulling side, and wherein said drive belt is arranged on said first pulling side, and a spring is arranged on said second pulling side.

9. Seat according to claim 8, wherein the spring is designed as a tension spring which acts, on the one hand, on the drive belt and, on the other hand, on the circumference of one belt pulley.

10. Seat according to claim 8, wherein the spring is designed as a torsion spring which is arranged coaxially with respect to the pivot connection of the rear legs, said spring having a spring leg which bears on the circumference of the belt pulley and is fastened there on the drive belt.

11. Seat according to claim 1, wherein at least one of the belt pulleys has a contour having a circumference line which is spaced at a distance from a center point which is coaxial with the pivot connection of the associated legs, said distance changing at least over a range of angles at the circumference, and wherein said at least one of the belt pulleys is arranged such that the maximum spacing of the circumference line from the center point approximately coincides with a line of connection which passes through the pivot connections of the front and rear legs, locked on the vehicle floor, on the seat frame.

12. Seat according to claim 11, wherein said contour is in the form of an ellipse, the larger ellipse axis coinciding with the line of connection.

13. Seat according to claim 11, wherein said contour is in the form of a segment of a circle with two diametrically opposite circle-arc portions having different radii of curvature.

14. Seat according to claim 11, wherein the drive belt is designed as a flat belt consisting of a tension-resistant, flexurally soft material.

15. Seat according to claim 11, wherein the drive belt is produced as an injection-molded plastic part, and the fastening elements are molded on the drive belt.

16. Seat according to claim 11, wherein the drive belt is designed as a toothed belt or V-belt.

17. Seat according to claim 1, wherein the first belt pulley is seated in a rotationally fixed manner on a front shaft which is connected rigidly to said pair of front legs, and the second belt pulley is seated in a rotationally fixed manner on a rear shaft which is connected rigidly to said pair of rear legs.

18. Seat according to claim 1, wherein each of said front legs is connected in a rotationally fixed manner to a respective said first belt pulley and each of said rear legs is connected in a rotationally fixed manner to a respective said second belt pulley, and wherein each respective said first belt pulley is connected to a respective of said second belt pulleys by a respective said drive belt.

* * * * *